Patented Dec. 24, 1929

1,740,693

UNITED STATES PATENT OFFICE

MILTON S. HERSHEY, OF HERSHEY, PENNSYLVANIA

PROCESS OF MANUFACTURING SUGAR

No Drawing.      Application filed June 7, 1928. Serial No. 283,740.

My invention covers a sugar having the composition of clarified cane or beet juice with all the sugars and molasses forming the ingredients of the natural sugar cane or beet retained and held in a state of extremely fine crystallization.

My invention also includes the process of obtaining a sugar of the character described from the natural raw clarified sugar cane or beet juices with nothing whatever removed therefrom except such impurities as must be removed to make an edible product.

In practicing this process, I find it preferable to fill a vacuum pan nearly full with the raw clarified sugar juice and boil the mass of juices, without addition, down rapidly until it reaches a density where it cannot be removed without pressure from the pan and it reaches the thickest possible density where it can be economically and practically removed under pressure from the pan.

The boiling is preferably effected between temperature ranges varying from 125 degrees to 145 degrees Fahrenheit, and at pressures varying from twenty-three to twenty-seven inches.

The temperature and pressure ranges given are those found preferable in large scale manufacturing. It can be practiced in an open kettle at atmospheric pressure and at such temperatures as will avoid burning of the juice and caramelization thereof.

The essential part of the process lies in the removal of the boiled juice at a critical point in the boiling, and subsequent agitation to convert the boiled mass into crystalline form. This critical point is determined by the operator who frequently removes "proofs" from the pan when the last "proof" removed has a consistency such that it may be rolled as a ball between the operator's fingers and will retain its shape.

When the boiled mass reaches the critical stage of density, it contains about nine or ten per cent of moisture and has about arrived at the limit where it can be freely removed from the pan, by a ten pound air pressure and all the sucrose of the mass crystallizable under these conditions is crystallized.

If the boiled juice were left in the condition it emerges from the vacuum pan, it would harden into a dense concrete mass. To convert the boiled juice into its crystalline sugar form, it becomes necessary to subject it to a further drying and separation process, outside the pan. In manufacturing on a large scale, I drop about ten tons of the boiled juice into a conveyor of suitable type and agitate the boiled juice during its passage from one end to the other of the conveyor.

During the passage of the boiled juice through the conveyor an air blast which may be heated is delivered on to the agitated juice. The bottom and sides of the conveyor are water jacketed and may be heated to hasten the drying process, the speed of operation of which will obviously depend upon the rate at which the boiled mass is fed through the conveyor, the temperature and hygrometric state of the air blast; and the temperature of the conveyor jacket. These are factors which may be varied within wide limits by persons skilled in the art in accordance with variations of the scale of manufacture and climatic conditions of the location of the plant.

The boiled juice dropped from the vacuum pan enters the conveyor at one end as a thick liquid mass at practically its limit of fluidity and emerges from the other end of the conveyor, as a mealy crystalline sugar having crystals so fine as to be almost imperceptible. There is no division of sirup from sugar in the mass discharged from the vacuum pan; the whole mass is converted from a mass of very dense liquid into a free flowing and extremely finely divided solid, without by-product of any kind whatsoever, and adapted without further mechanical treatment for domestic and manufacturing uses.

This application is a continuation-in-part of my co-pending United States application, Serial No. 208,658, filed July 26, 1927, which is, in turn, a continuation-in-part of my abandoned applications, Serial Nos. 162,922 and 91,820, filed January 22, 1927, and March 2, 1926, respectively.

What I claim is:

1. The process of manufacturing sugar from clarified sugar juice, which consists in boiling a mass of said juice, without addition, until its density is such that a small sample thereof will approximately retain the shape to which it may be molded between the fingers of an operator, then agitating the boiled liquid mass, and drying the said mass during the agitation thereof until the whole liquid mass becomes converted into a free flowing finely divided crystalline solid sugar holding all the dried solids of the mother liquor.

2. The process of manufacturing sugar which consists in boiling a mass of clarified sugar juice without additions in vacuo until all the sucrose capable of crystallization during such boiling of the mass crystallizes, then agitating and drying the boiled mass until the crystals separate and the whole boiled dense liquid mass changes from its liquid state to a mass of free flowing crystalline solid sugar holding all the dried solids of the mother liquor.

3. The process of manufacturing sugar which consists in boiling a mass of clarified sugar juice in vacuo, and without additions thereto during the boiling thereof, until the mass assumes a density such that a small sample thereof molded between the fingers of the operator will approximately retain its molded shape, then agitating the boiled liquid mass, and drying the mass during the agitation thereof until the whole liquid mass becomes a mass of free flowing crystalline solid sugar holding all the dried solids of the mother liquor.

4. The process of manufacturing sugar which consists in boiling a mass of clarified sugar juice in vacuo and without additions thereto during the boiling thereof, until the mass assumes a density such that a small sample thereof molded between the fingers of the operator will approximately retain its molded shape, then agitating the boiled liquid mass and subjecting the mass during the agitation thereof to a drying air blast until the whole liquid mass becomes a mass of free flowing crystalline solid sugar holding all the dried solids of the mother liquor.

In testimony whereof I affix my signature.

MILTON S. HERSHEY.